United States Patent [19]

Longo

[11] Patent Number: 4,483,813

[45] Date of Patent: Nov. 20, 1984

[54] INSIDE, FULL 360 DEGREE MOLD

[75] Inventor: Charles M. Longo, Freehold, N.J.

[73] Assignee: Studio Design, Inc., T/A Rainbow Art Glass, Neptune, N.J.

[21] Appl. No.: 495,539

[22] Filed: May 17, 1983

[51] Int. Cl.$^3$ .................... B29C 1/02

[52] U.S. Cl. .................... 264/225; 249/60; 264/219; 264/220

[58] Field of Search .................... 264/219, 220, 225, 292; 249/60; 428/38

[56] References Cited

U.S. PATENT DOCUMENTS

| | | | |
|---|---|---|---|
| 3,872,574 | 3/1975 | Worden | 29/469 |
| 4,009,309 | 2/1977 | Holt | 428/38 |
| 4,205,036 | 5/1980 | Trame | 264/132 |
| 4,343,758 | 8/1982 | Goralmik | 264/254 |

FOREIGN PATENT DOCUMENTS

| | | | |
|---|---|---|---|
| 1157735 | 6/1958 | France | 264/292 |

*Primary Examiner*—James B. Lowe

*Attorney, Agent, or Firm*—Stephen W. White

[57] ABSTRACT

A mold, useful in preparing Tiffany-like lampshades, terrariums and glass lamp bases is described. The process for preparing this mold, which produces sections of a 360 degree unit within which the assembler works, is also described.

5 Claims, 2 Drawing Figures

INSIDE, FULL 360 DEGREE MOLD

BACKGROUND OF THE INVENTION

1. Field of the Invention

This invention relates to a process of making molds and more particularly to a method for preparing a mold useful in manufacturing lampshades, terrariums and glass lamp bases. Still more particularly, this invention relates to a mold in which cut glass used to make lampshades, terrariums and glass lamp bases is laid on the inside thereof thus facilitating the manufacturing process.

2. Description of the Prior Art

Cut glass lampshades are very desirable because of their intrinsic beauty. One particularly type of cut glass lampshade is generally known as the "Tiffany" type of shade and is particularly popular for furnishing houses, places of business such as restaurants, shops and the like. The original Tiffany lampshade was made during the turn of the century and was, and still is, extremely popular. The original is, however, prohibitively costly since there were only a limited number of these very beautiful lampshades made over a period of time and they have become collector items. Thus, there is a growing market for lampshades fabricated in the Tiffany-style. Close approximation of the original can be made by artisans of extraordinary skill who cut the glass to match the original Tiffany patterns and carefully solder the pieces together to prepare a lampshade which looks much like the original. These copies of the original are also very costly since they require an inordinate amount of time for a skilled craftsman to make by hand and thus they too are out of reach for the general user.

The prior art describes a number of mold techniques which claim to permit one of ordinary skill in the art to fabricate a lampshade said to approximate those of the Tiffany-style. All of these prior art elements have several draw backs and the finished lampshade does not always appear to match the Tiffany-style. For example, one such prior art molding technique offers the user only a single quadrant or other portion of the desired, finished 360 degree lampshade. The user cuts the glass pieces to match the mold portions and lays these pieces on the outside of this section. The user them must tape or pin the pieces together to hold them for soldering. When the soldering is complete, another section must be made on the same mold section and when all the sections are complete, the user must solder them together in order to achieve the 360 degree shade. This process is quite difficult to achieve without a great deal of skill and patience and the final shade does not often look like a Tiffany-style lampshade and appears rough and of amateur quality. There are other references describing methods of making Tiffany-style lampshade or look-alikes and molds for making same. However, all of these methods have serious draw-backs and the finished product does not appear to copy the authentic Tiffany lampshade.

SUMMARY OF THE INVENTION

It is an object of this invention to provide a method for preparing forms which can be used to make Tiffany-style lampshades, terrariums and glass lamp bases. It is a further object of this invention to provide a method for making 360 degree molds.

These and other objects are achieve by providing forms for mold construction made by the steps comprising:

preparing a hemispherical master form which reflects the desired shape and final form of the mold;

applying a layer of formable, hardenable resin to said master;

placing filamental wire on said resin layer to define a desired pattern thereon;

applying a second layer of said resin over the filamental wire;

applying heat and pressure to said master form to cause said resin layers to form integrally around said filamental wire so as to cause definable, patterned ridges over the surface thereof; and casting a copy of said patterned ridges by applying a thin, deformable plastic sheet thereon and applying sufficient heat and pressure to cause said plastic to form a copy of said patterned ridges therein, whereby a series of said copies can be used to form a 360 mold for use in preparing objects taken from the group comprising lampshades, terrariums and lamp bases by the application of transparent material cut to fit within said patterned ridges.

DETAILS OF THE INVENTION

Figure 1:
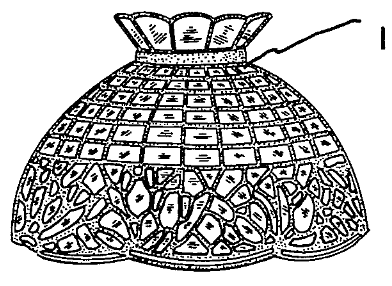
FIG. 1 is a view of a typical Tiffany-style lampshade that can be made following the teachings of this invention.

Referring now specifically to the drawing, FIG. 1 shows a typical Tiffany-style lampshade that can be made when the mold prepared according to this invention and subsequent directions are followed. While there are a whole host of different styles and shapes of Tiffany-style lampshades, this figure shows only one of the more popular styles entitled the "Tulip".

Figure 2:
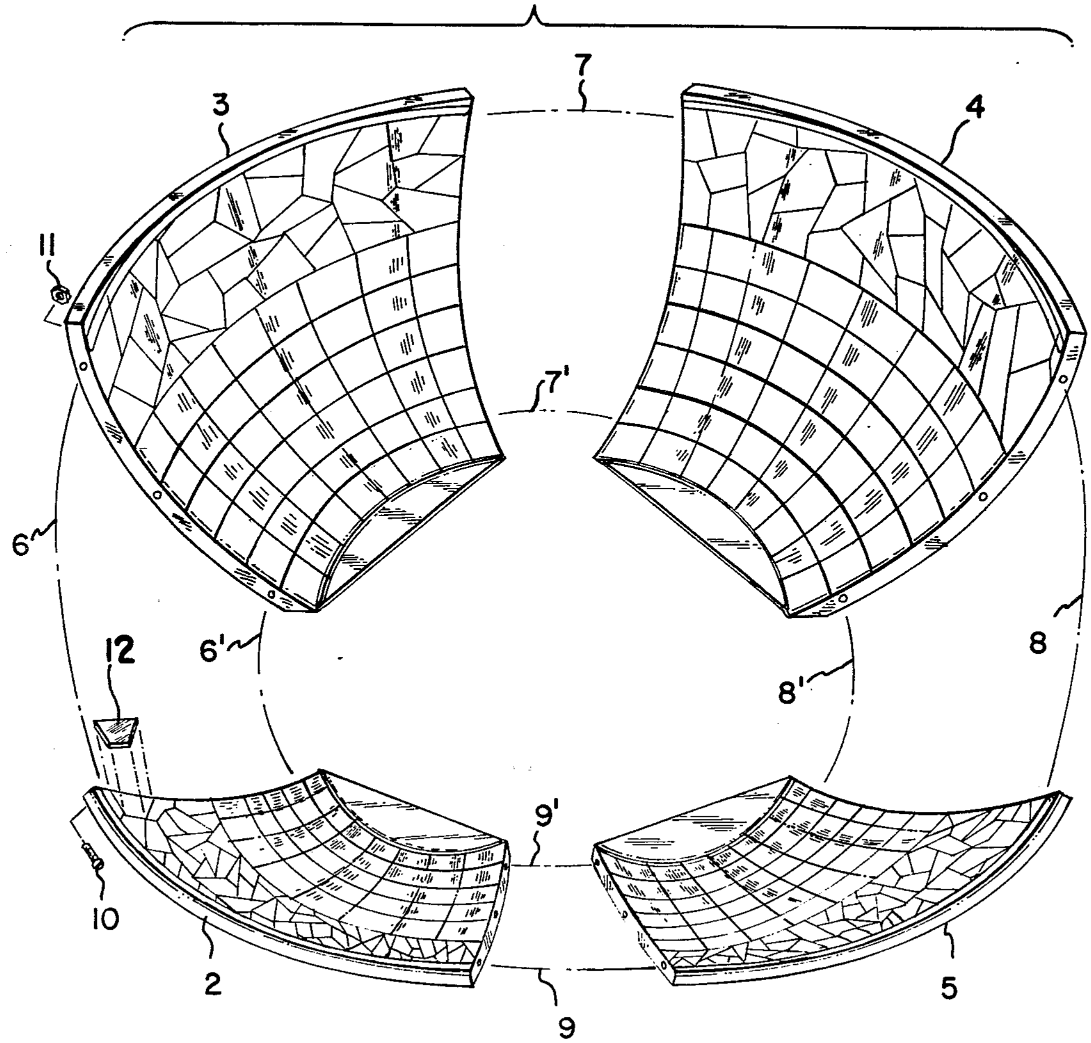
FIG. 2 shows four quadrants of a typical mold of this invention which can be used to make the Tiffany-style lampshade of FIG. 1.

FIG. 2 shows a typical mold of this invention which can be made according to this specification and which can be used subsequently to make the Tulip style of lampshade shown in FIG. 1. In this figure, the four quadrants of this particular mold are shown as 2, 3, 4, and 5. The final mold is then assembled from these four quadrants along lines 6—6', 7—7', 8—8' and 9—9' using sets of bolts and nuts shown in this figure as 10 and 11 which are placed along the referenced lines to make the connection of quadrant to quadrant thus forming the final 360 degree mold of this invention. In the embodiment shown in the drawing, there are four quadrants, each of 90 degrees, to make up the full, 360 degree mold.

The mold shown in the drawing can be used to fabricate a beautiful, Tiffany-style lampshade. The patterns formed by the filamental wire during the manufacture thereof (to be fully described later in this specification) form ridges on the inside of the four quadrant mold. Pieces of cut glass, usually colored, are laid inside the mold and fitted within the ridges. In FIG. 2 a piece of cut glass 12 is shown being installed therein. Many of these pieces are required to complete the lampshade and each must be soldered to form the final, Tiffany-style shade.

PREPARATION OF THE MOLDS

The mold shown in FIG. 2 of the drawing is simply a copy of a master mold form which must first be made. Conventionally, this first master mold is prepared by hand. It may be formed out of wood, for example, and is made in the general shape of the lampshade desired. In this particular embodiment, the master will normally be made as one half of an orb or sphere and this shape is most popular for Tiffany-style lampshades. Generally, this first, master mold is a full, 360 degree mold. Then, the master mold may be sectioned into 90 or 120 degree sections or quadrants for ease of use. A female, second master mold copy is made from the first master following these general steps:

1. Apply a formable resin (e.g. fiberglass filled with conventional epoxy and hardener) as a thin layer over the wooden, first master mold.

2. After the formable resin has hardened, apply filamental wire to the surface thereof to form ridged patterns thereon, said patterns defining the desired sections into which glass is to be laid on a copy thereof to form the lampshade. Usually, a fixed pattern of this of this filamental wire is made on paper to be used later to assist in cutting the glass to match the pattern in the mold.

3. Apply a thin, second layer of formable resin so that the definable ridges of filamental wire are covered but are not obscured, forming a final copy of said first master mold.

4. Apply sufficient heat and pressure to the surface of the formable resin so as to cause the resin to harden and form the final, master copy.

This copy, now a second master mold, is used as a master to make a plurality of copies, four quadrants of which, in the embodiment shown, can be used to make a Tiffany-style lampshade. In some case, of course, where the mold has been made in 120 degree sections, only three are necessary to form a 360 degree final mold, for example. These copies are generally made by placing the second master mold on a suitable platen and then placing a thin sheet of plastic material (e.g. 0.055 gauge styrene) thereon and applying sufficient heat and pressure (e.g. 500° F. and 28 psig) to cause said plastic sheet to form in and around the ridges of said second master. This final step then forms perfect, single sections of the second master. In the embodiment shown, four quadrants of the second master copy are then joined together as shown in FIG. 2 to form a full, 360 degree mold kit from which a Tiffany-style lampshade, for example, can be made. It can be seen then, that many, relatively cheap copies of the original can be made to form kits.

USE OF THE 360 DEGREE MOLD KIT

In the preparation of a Tiffany-style lampshade, for example, using the full, 360 degree lamp mold of this invention, the user first joins the sections together as shown in FIG. 2. The sections, which are quadrants in this embodiment, can be joined along the lines 6—6′, 7—7′, 8—8′, and 9—9′ with bolts 10 and nuts 11 as shown. Additional stiffening may be added by further stapling between the connection joints and bolts and nuts may be added in two or more locations along each seam. The full, 360 degree mold is then placed in a suitable support such as within a basin, pail, carton, etc. to assist in holding the mold while the transparent material is being placed therein. It is conventional to use stained glass or colored or plain glass cut according to the pattern which follows the patterned ridges already formed within the mold (shown as irregular and regular lines in the drawing). A pattern sheet is customarily furnished with the mold kit, said pattern sheet following the manufactured ridges exactly. As each piece of glass is cut, the piece is placed within the corresponding ridge area inside the mold and checked for accuracy of fit. Just such a piece 12 is shown being installed near the rim of quadrant 2 in FIG. 2. In reality, it is best to start from the lowest point of the quadrant and work upwards towards the rim. As each piece is checked for accuracy, it is then fitted within the patterned ridges by wrapping it with copper foil, for example, which insures the snugness of fit and to which solder will adhere when applied later on during the making operation. When a few of the glass pieces have been installed, it is customary to tack solder them temporarily in place before proceding further to prevent the glass pieces from falling out.

This process is then repeated until all of the cut glass pieces are installed within the mold and all have been tack soldered in place and all of the sections are full. When this accomplished, and the glass pieces appear to be firmly in place, the lampshade is finally soldered along all of the joints on the inside. The mold is then disassembled and solder applied to all the joints on the outside. The edges may be finished as desired and may be strengthened with copper wire soldered thereon, in fact it is so preferred. A decorative top, if so called for, may then be soldered in place and the lampshade is ready for installation of the wiring and suitable light fixtures and hanging devices.

The result of all this is a beautiful, finished, Tiffany-style lampshade that approximates very closely the original art work. Many styles can be selected for the user, each made from a set of master molds as shown and described above. All of this was not possible for the average aritisan to accomplish using any of the prior art teachings. If the artisan tried to copy an original Tiffany-style lampshade using free style, forming and soldering the glass pieces individually, the result is not always like the original and takes a great deal of skill to perform. If, on the other hand, the artisan tries to use mold devices described in the prior art, ones which do not offer a full, 360 degree mold and which do not allow the installation of the glass on the inside thereof—a step which allows for individual adjustment of each piece of glass in order to achieve a smooth, Tiffany-style lampshade—the result appears very rough and uneven. This effect, seen with the prior art molds, results from the method of installation which requires that the glass be kept in place by double-side tape or with pins prior to soldering and from the fact that each section must be soldered after it is formed. The casual hobbyist, then, using the mold of this invention, can make and enjoy Tiffany-style lampshades following the teachings of this invention and all at a reasonable cost.

A number of other embodiments which are obvious to those of normal skill in the art of lampshade, lamp mold, terrarium and lamp base manufacture can be used equally well in the practise of this invention. For example, there are numerous plastics and resins that can be used. A metal first master mold might be substituted for the wooden one described above. In place of glass (colored or plain), one might substitute plastic (colored or plain) and then use a glue in place of the solder. Although those embodiments are not preferred, since the result is not equivalent to the original, they represent simple substitutions and play no particular role in the invention which is fully explained and claimed in this specification.

As has been previously mentioned, the mold of this invention finds uses other than the manufacture of lampshades. Terrariums and lamp bases are often made in 360 degree shapes from half spheres and are of glass of different colors. The mold of this invention may thus find other uses as just described.

I claim:

1. A method for preparing molds for use in making decorative, 360 degree elements taken from the group comprising lampshades, terrariums and lamp bases, comprising the steps of:

preparing a hemispherical master form which reflects the desired shape and final form of the mold;

applying a layer of formable, hardenable resin to said master;

placing filamental wire on said resin layer to define a desired pattern thereon;

applying a second layer of said resin over said filamental wire;

applying heat and pressure to said master form so as to cause said resin layers to form integrally around said filamental wires causing definable, patterned ridges over the surface thereof; and, casting a copy of said patterned ridges by applying a thin, deformable plastic sheet thereon and applying sufficient heat and pressure to cause said plastic to form a copy of said patterned ridges therein, whereby a series of said copys can be used to form a 360 mold for use in preparing said lampshades, terrariums and lamp bases by the application of transparent materials cut to fit within said patterned ridges.

2. The method of claim 1 wherein the composition of said master mold is taken from the group consisting of wood and metal.

3. The method of claim 1 wherein said resin is a mixture of resin, epoxy and hardner for said epoxy.

4. The method of claim 1 wherein said plastic sheet is taken from the group consisting of styrene and polyvinyl chloride.

5. The method of claim 1 wherein said transparent material is stained glass.

* * * * *